United States Patent
Zaloga et al.

(10) Patent No.: US 8,517,422 B2
(45) Date of Patent: Aug. 27, 2013

(54) STEERING WHEEL ALIGNMENT SYSTEM

(75) Inventors: Miroslaw Zaloga, Shelby Township, MI (US); George E. Doerr, Clarkston, MI (US); Christopher J. Mielke, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 104 days.

(21) Appl. No.: 13/164,884

(22) Filed: Jun. 21, 2011

(65) Prior Publication Data

US 2012/0326424 A1  Dec. 27, 2012

(51) Int. Cl.
*B62D 1/184* (2006.01)
*F16B 7/18* (2006.01)
*F16D 1/12* (2006.01)

(52) U.S. Cl.
USPC ............ 280/775; 180/78; 74/493; 403/379.3; 403/359.5; 403/373; 403/408.1

(58) Field of Classification Search
USPC ................. 280/775, 779, 771, 93.51, 93.502; 180/78; 74/493, 492, 552; 403/379.3, 378, 403/359.4, 359.5, 373, 408.1, DIG. 9, FOR. 100, FOR. 103
See application file for complete search history.

(56) References Cited

U.S. PATENT DOCUMENTS 4,662,775 A * 5/1987 Faul .............................. 403/365
6,726,228 B2  4/2004 Crawford

FOREIGN PATENT DOCUMENTS

KR  2006/002520 A * 1/2006

* cited by examiner

Primary Examiner — Keith Frisby

(57) ABSTRACT

A steering wheel alignment system for a vehicle having a steering wheel and steering unit that includes a first shaft operatively connected to the steering unit, a second shaft operatively connected to the steering wheel, and a coupling disposed between the first and second shafts to couple the shafts so that rotation of the steering wheel operates the steering unit to steer the vehicle. The coupling includes: a bolt, one of the shafts is hollow to telescope over the other shaft, and each shaft has a radial extending hole therethrough for receiving the bolt to attach the first and second shafts together. The radial extending hole through one of the shafts is elongated in the radial direction so that when the bolt extends through the holes of the first and second shafts the elongation of the hole defines a range of radial adjusting movement of the shafts relative one another until tightening of the bolt clamps the first and second shafts together against further relative rotation.

19 Claims, 2 Drawing Sheets

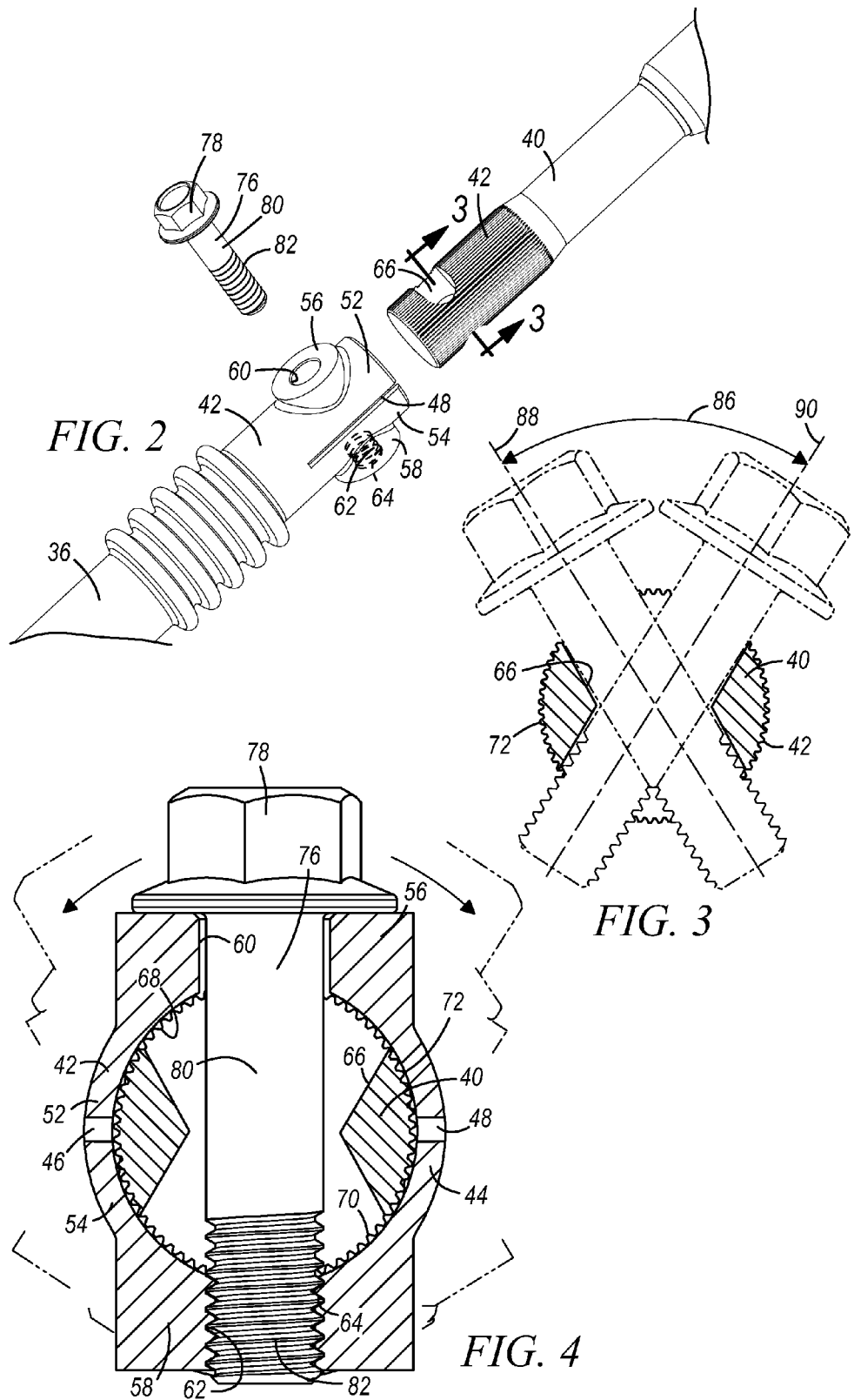

US 8,517,422 B2

STEERING WHEEL ALIGNMENT SYSTEM

FIELD OF THE INVENTION

The present invention relates generally to steering systems for vehicles and, more particularly, to a steering wheel alignment system for a steering system of a vehicle.

BACKGROUND OF THE INVENTION

It is known to provide a steering system for a vehicle to allow a driver to steer the steerable front wheels of the vehicle. In a vehicle such as a car or truck, the steering system typically includes a steering wheel, a steering shaft connected to the steering wheel, a steering unit connected to the steering shaft and one or more members such as a tie rods connected to the steering unit with the steering knuckles for the front wheel. The steering wheel typically includes a hub connected to the steering shaft, an outer rim spaced from and surrounding the hub, and a plurality of spokes interconnecting the hub and rim.

In most vehicles, when the wheels are aligned straight, the steering wheel is oriented such that the spokes of the steering wheel are generally horizontal in a home or neutral position. By precisely aligning the steering wheel with the straight ahead position of the vehicle wheels, the driver is intuitively informed that the vehicle will travel in the straight ahead direction.

In order to obtain this precise alignment between the steering wheel and the vehicle wheels, a complex adjustment of the steering system is undertaken by adjusting tie rod lengths or drag links to realign or center the steering wheel in the home or neutral position, which is time consuming and costly. In the alternative, the steering wheel can be lifted from the steering column and then reinstalled in order to obtain the desired precise alignment.

Therefore, it would be desirable to provide a mechanism to allow alignment of the steering wheel to the home or neutral position without affecting the steering system. It is also desirable to provide a disconnect between the steering unit and the steering wheel for alignment of the steering wheel relative to the wheels. It is further desirable to provide a mechanism for precise alignment of the steering wheel relative to the wheels and vehicle, which is relatively simple and inexpensive.

SUMMARY OF THE INVENTION

A steering wheel alignment system for a vehicle having a steering wheel and steering unit that includes a first shaft operatively connected to the steering unit, a second shaft operatively connected to the steering wheel, and a coupling disposed between the first and second shafts to couple the shafts so that rotation of the steering wheel operates the steering unit to steer the vehicle. The coupling includes: a bolt, one of the shafts is hollow to telescope over the other shaft, and each shaft has a radial extending hole therethrough for receiving the bolt to attach the first and second shafts together. The radial extending hole through one of the shafts is elongated in the radial direction so that when the bolt extends through the holes of the first and second shafts, the elongation of the hole defines a range of radial adjusting movement of the shafts relative one another until tightening of the bolt clamps the first and second shafts together against further relative rotation.

Further areas of applicability of the present invention will become apparent from the detailed description provided hereinafter. It should be understood that the detailed description and specific examples, while indicating exemplary embodiments of the invention, are intended for purposes of illustration only and do not limit the scope of the invention.

BRIEF DESCRIPTION OF THE DRAWINGS

The present invention will become more fully understood from the detailed description and the accompanying drawings, wherein:

FIG. 2 is an enlarged fragment of FIG. 1 and showing the parts exploded to show the steering alignment system.

FIG. 3 is a section view taken in the direction of arrows 3-3 of FIG. 2.

FIG. 4 is a section view similar to FIG. 3 but showing the steering alignment system in its fully assembled position.

DETAILED DESCRIPTION OF THE EXEMPLARY EMBODIMENTS

Figure 1:
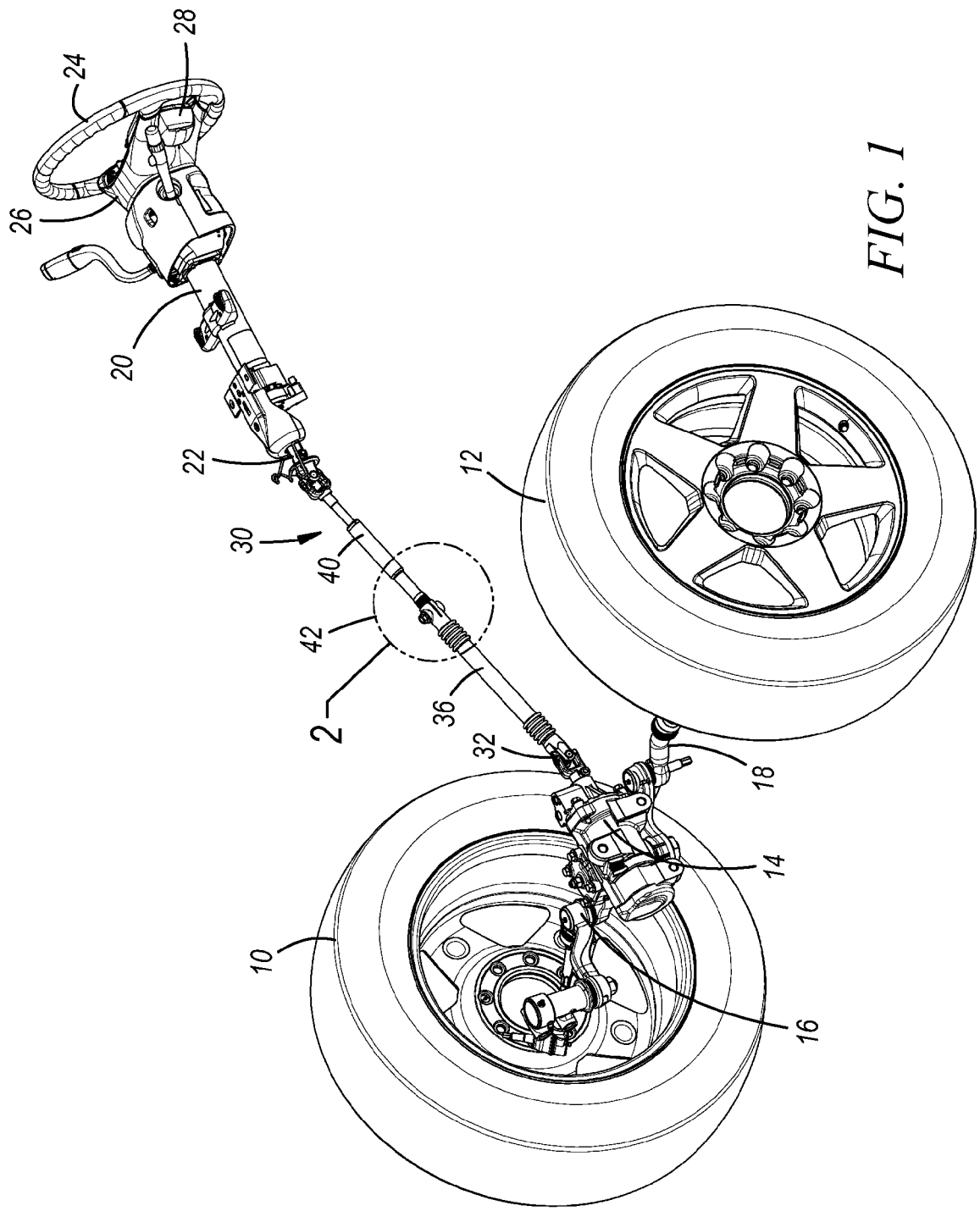
FIG. 1 is a perspective view of a vehicle steering system having the steering alignment system of this invention.

The following description of certain exemplary embodiments is merely exemplary in nature and is not intended to limit the invention, its application, or uses.

Referring to FIG. 1, a steering system for a motor vehicle includes steerable wheels 10 and 12, and a steering gear unit 14 that is operably connected to the steerable wheels 10 and 12 by steering linkages 16 and 18. A steering column 20 is mounted within the occupant compartment and rotatably mounts a steering wheel 24 on a steering wheel shaft 22. The steering wheel 24 has spokes 26 and 28.

A steering shaft assembly 30, which can include one or more shaft segments, is provided to connect the steering wheel shaft 22 to an input shaft 32 of the steering gear unit 14. In particular, in FIG. 1, the steering shaft assembly 30 includes a first shaft 36 connected to the input shaft 32 of the steering gear unit 14, and a second shaft 40 connected to the steering wheel shaft 22 that is housed within steering column 20 and connected to the steering wheel 24. An adjustable coupling assembly 42 of this invention connects the first shaft 36 and the second shaft 40.

Referring to FIGS. 2, 3 and 4, the adjustable coupling assembly 42 is shown in greater detail. The first shaft 36 includes a hollow tubular end fitting 44 that is circular in cross section and has a pair of longitudinal extending clearance slots 46 and 48 that divide the end fitting 44 into a first clamping half 52 and a second clamping half 54. A raised boss 56 is provided on the first clamping half 52 and a second raised boss 58 is provided on the second clamping half 54. These raised bosses 56 and 58 can be integral with the end fitting 44 or can be separate pieces that are welded onto the end fitting 44. A bolt hole 60 is provided through the raised boss 56 and a similar bolt hole 62 is provided through the boss 58. Bolt hole 62 has internal threads 64. As best seen in FIG. 4, the end fitting 44 is hollow and tubular in shape with the first clamping half 52 and the second clamping half 54 respectively having interior curved walls 68 and 70 that are semi-circular in shape.

The second shaft 40 has splines 72 formed on the outer surface thereof. An oversized bolt hole 66 extends radially through the second shaft 40. A bolt 76 is provided that is installed as shown in FIG. 4. The bolt 76 includes a head 78, a shank 80, and a threaded end 82. The shank 80 is inserted through the hole 60 of boss 56 and through the oversize bolt hole 66 of the second shaft 40. The threaded end 82 is threaded into the threads 64 of the boss 58. Tightening of the bolt 76 will draw the first clamping half 56 and second clamping half 58 closer together as permitted by the clearance slots 46 and 48 so that the interior curved walls 68 and 70 of the first and second clamping half 56 and 58 will forcefully grip the second shaft 40. The splines 72 on the second shaft 40 enhance the gripping action.

As best seen in FIG. 3, the oversize hole 66 of the second shaft 40 has a bowtie shaped cross section, by which the hole 66 is enlarged in the radial direction of arrow 86 to accommodate relative rotary movement between the first shaft 36 and the second shaft 40 prior to the tightening of the bolt 76. Thus, as shown in FIG. 3, the bolt 76 can rotate with the first shaft 36 through an angular range of motion 86, between the end positions designated 88 and 90 in FIG. 3. This range of radial adjusting motion is thus defined by the shape of the bowtie shaped cross-section that defines the radial enlargement of the hole 66.

In operation, the steering system can be assembled in the vehicle assembly plant by connecting together each of the components shown in FIG. 1. It is desirable that the steerable wheels 10 and 12 and the steering wheel 24 be perfectly aligned with one another. In particular, it is desired that when the steerable wheels 10 and 12 are pointed perfectly straight ahead, the steering wheel will be correspondingly aligned with the spokes 26 and 28 symmetrically positioned with respect to the horizontal so that the driver will intuitively sense that the vehicle is traveling straight ahead.

This perfect alignment of the steering system is obtained by making a final adjustment of the steering system via the adjustable coupling 42 of this invention. In particular, the bolt 76 will be loosened to unclamp the first shaft 36 from the second shaft 40. Then, with the steerable wheels 10 and 12 pointed straight ahead, the steering wheel 24 can be rotated slightly as permitted by the rotation of the second shaft 40 within the limits of rotation defined by the shape of the bowtie shaped oversize hole 66. Then, bolt 76 is tightened, causing the first clamping half 52 and second clamping half 54 to forcibly grip the second shaft 40.

Thus, it is seen that the invention has provided a new and improved alignment system for a vehicle steering system. It will be understood that the first shaft 36 and second shaft 40 are telescopically connected by virtue of one of at least one of the shafts being hollow in order to receive the end of the other shaft. Although the drawings herein show the example of the end fitting 44 that provides the hollow shaft, it will be understood that the shaft 36 can be a hollow tube so that the longitudinal slots 46 and 48 can be provided directly in the hollow tube of the shaft 36. In addition, it will be understood that the oversize slot 66 can be provided in either the outer shaft or the inner shaft. Furthermore, although the drawings herein show splines provided on the outside of the inner shaft, the splines could be provided on the inside of the outer shaft or the splines could be provided on both of the shafts. In addition, the splines could be replaced by knurling or other surface treatment in order to enhance the clamping action between the outer shaft and the inner shaft.

Although the drawings herein show the adjustable coupling 42 as being located between the two shafts 36 and 40, it will also be understood that the adjustable coupling 42 of this invention could be provided anywhere within the steering shaft assembly 30 of FIG. 1. For example, the adjustable coupling 42 could be provided at the input shaft 32 of the steering gear unit 14, or, the adjustable coupling 42 of this invention could be provided in the steering wheel shaft 22.

What is claimed is:

1. A steering wheel alignment system for a vehicle comprising:
    a steering wheel;
    a steering unit;
    a first shaft operatively connected to said steering unit;
    a second shaft operatively connected to said steering wheel; and,
    a coupling disposed between the first and second shafts to couple the shafts so that rotation of the steering wheel operates the steering unit to steer the vehicle;
    wherein the coupling includes a bolt, one of the shafts is hollow to telescope over the other shaft, the one of the shafts that is hollow to telescope over the other shaft having a plurality of longitudinally extending slots defining a plurality of clamping portions each clamping portion having a curved internal wall for gripping the other shaft, each shaft has a radial extending hole therethrough for receiving the bolt to attach the first and second shafts together, the radial extending hole through one of the shafts being elongated in the radial direction so that when the bolt extends through the holes of the first and second shafts, the elongation of the hole defines a range of radial adjusting movement of the shafts relative one another until tightening of the bolt clamps the first and second shafts together against further relative rotation.

2. The steering wheel alignment system of claim 1 further comprising the one of the shafts that is hollow to telescope over the other shaft includes a hollow end fitting that fits over the other shaft.

3. The steering wheel alignment system of claim 1 further comprising the one of the shafts that is hollow telescopes over the other shaft and includes diametrically opposed bosses formed thereon having bolt holes there through.

4. The steering wheel alignment system of claim 3 further comprising one of the bosses having internal threads therein and the bolt having external threads that engage with the internal threads of the one of the bosses.

5. The steering wheel alignment system of claim 1 further comprising splines provided on at least one of the shafts to be gripped by the other shaft.

6. The steering wheel alignment system of claim 1 further comprising the radial extending hole through one of the shafts being elongated in the radial direction and having a bowtie shaped cross section.

7. The steering wheels alignment system of claim 1 further comprising the radial extending hole through one of the shafts that is elongated in the radial direction is provided in the hollow shaft that telescopes over the other shaft.

8. The steering wheel alignment system of claim 1 further comprising the radial extending hole through one of the shafts that is elongated in the radial direction is provided in the other shaft.

9. The steering wheel alignment system of claim 1 further comprising the one of the shafts that is hollow to telescope over the other shaft having opposed longitudinally extending slots defining first and second clamping portions, each clamping portion having a curved internal wall for gripping the other shaft, a boss formed in each of the clamping portions and each boss having a bolt hole therein, and the other shaft having the elongated bolt hole therein.

10. A steering wheel alignment system for a vehicle comprising:
    a steering wheel having a home position in which the driver perceives that the vehicle is steered straight ahead;
    a steering unit having a position in which the vehicle is steered straight ahead;
    a first shaft operatively connected to said steering unit;
    a second shaft operatively connected to said steering wheel;

and a coupling disposed between the first and second shafts to couple the shafts so that rotation of the steering wheel operates the steering unit to steer the vehicle, said coupling including;

a bolt;

one of the shafts being hollow to telescope over the other shaft and having first and second longitudinal slots defining a first clamping portion and a second clamping portion, a boss formed in each of the clamping portions and each boss having a bolt hole therein;

and the other shaft having an elongated bolt hole therein so that when the bolt extends through the holes of the first and second shafts, the elongation of the elongated bolt hole defines a range of radial adjusting movement of the shafts relative one another to permit adjustment of the steering wheel position and steering unit position relative one another until tightening of the bolt causes the first and second clamping portions to clamp the other shaft therebetween against further relative rotation so that the steering wheel can be established at its home position when the vehicle wheels are steered straight ahead.

11. The steering wheel alignment system of claim 10 further comprising the one of the shafts that is hollow to telescope over the other shaft includes a hollow end fitting that fits over the other shaft and the longitudinal slots are provided in the hollow end fitting to define the first and second clamping portions.

12. The steering wheel alignment system of claim 10 further comprising the first and second clamping portions each having a curved internal wall for gripping the other shaft.

13. The steering wheel alignment system of claim 10 further comprising one of the bosses having internal threads therein and the bolt having external threads that engage with the internal threads on one of the bosses.

14. The steering wheel alignment system of claim 10 further comprising splines provided on at least one of the shafts to be gripped by the other shaft.

15. The steering wheel alignment system of claim 10 further comprising splines provided on the other shaft to be gripped by the first and second clamping portions of the one shaft.

16. The steering wheel alignment system of claim 11 further comprising the other shaft having a bowtie shaped cross section defining the radial elongation of the hole through the other shaft so that the bowtie shape defines the range of relative rotation between the one shaft and the other shaft.

17. A steering wheel alignment system for a vehicle comprising:

a steering wheel having a home position in which the driver perceives that the vehicle is steered straight ahead;

a steering unit having a position in which the vehicle is steered straight ahead;

a first shaft operatively connected to said steering unit;

a second shaft operatively connected to said steering wheel;

and a coupling disposed between the first and second shafts to couple the shafts so that rotation of the steering wheel operates the steering unit to steer the vehicle, said coupling including;

a bolt;

one of the shafts being hollow to telescope over the other shaft and having first and second longitudinal slots defining a first clamping portion and a second clamping portion, each of the first clamping portion and second clamping portion having internal curved walls adapted to grip the other shaft, a boss formed in each of the clamping portions and each boss having a bolt hole therein aligned with the bolt hole of the other boss, one of the bolt holes having internal threads therein;

and the other shaft having the hole therein that is elongated in the radial direction so that when the bolt extends through the holes of the first and second shafts the elongation of the hole defines a range of radial adjusting movement of the shafts relative one another to permit adjustment of the steering wheel position and steering unit position relative one another until tightening of the bolt causes the first and second clamping portions to clamp the other shaft therebetween against further relative rotation so that the steering wheel can be established at its home position when the vehicle wheels are steered straight ahead.

18. The steering wheel alignment system of claim 17 further comprising the one of the shafts that is hollow to telescope over the other shaft includes a hollow end fitting that fits over the other shaft and the longitudinal slots are provided in the hollow end fitting to define the first and second clamping portions.

19. The steering wheel alignment system of claim 17 further comprising splines provided on the other shaft to be gripped by the first and second clamping portions of the one shaft.

* * * * *